Oct. 1, 1935.   M. L. J. LAMBERT ET AL   2,016,113
COMPRESSED AIR GUN
Filed June 7, 1934
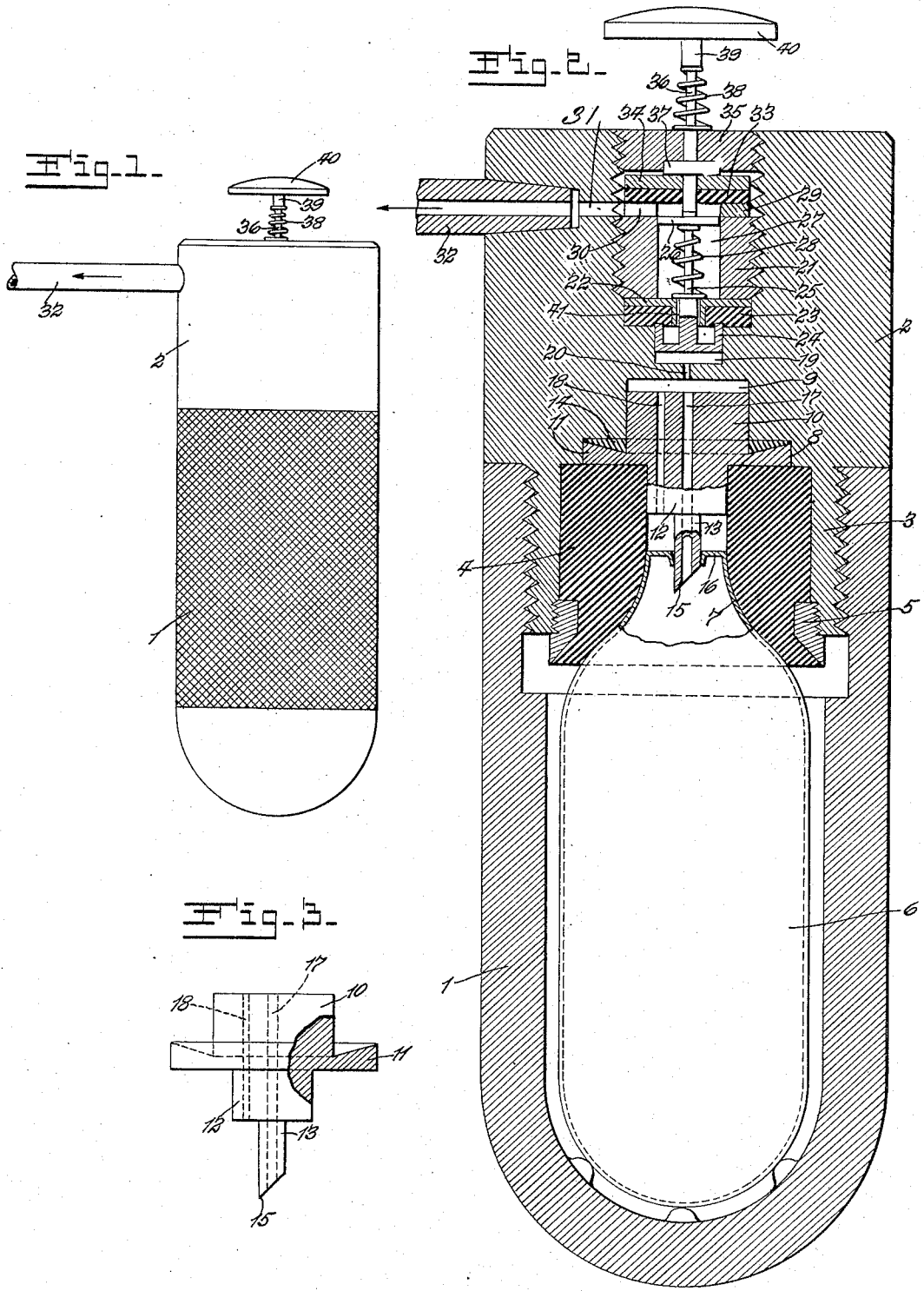
Inventors
Marion L. J. Lambert
Calvin Latham
by Pugsley & Kingsland
Their Attorneys Patented Oct. 1, 1935

2,016,113

UNITED STATES PATENT OFFICE 2,016,113

COMPRESSED AIR GUN

Marion L. J. Lambert, St. Louis, and Calvin Latham, St. Louis County, Mo., assignors of one-third to Isaac Dee Kelley, Jr., St. Louis, Mo.

Application June 7, 1934, Serial No. 729,376

3 Claims. (Cl. 221—73.5)

This invention relates to compressed air guns, and has special reference to portable instruments for use in controlling the discharge of compressed air from a container supported within the body of the instrument.

An object of the invention is to provide an improved portable compressed air gun having a body including two separably connected sections, one of which is hollow and is designed and adapted to receive and contain a cartridge or shell filled with compressed air and the other of which sections contains mechanism for opening the cartridge or shell and controlling the discharge of the compressed air therefrom, and sealing devices for preventing loss of the compressed air.

Another object of the invention is to provide an improved compressed air gun embodying novel mechanism for controlling the discharge of compressed air therefrom.

Other objects will appear from the following description, reference being made to the annexed drawing, in which—

Fig. 1 is a side elevation of our improved compressed air gun.

Fig. 2 is a greatly enlarged longitudinal sectional view.

Fig. 3 is a side elevation, partly in section, of a combined puncturing, sealing and passage forming element included in the invention.

Our improved portable compressed air gun comprises a housing including a hollow cylindrical member 1 permanently closed at one end and having the opposite end open and interiorly threaded. An opposite end member 2 of the housing is of approximately the same diameter as the diameter of the member 1 and is provided on one end with a reduced externally threaded extension 3 screwed into the open threaded end of the member 1. Portions of the peripheral surfaces of the members 1 and 2 may be knurled or spotted, so that they may be firmly held when the parts 1 and 2 are screwed together or are unscrewed.

An elastic hollow body 4 is mounted within the extension 3 of the member 1 and is supported therein by a ring 5 screwed into the inner end of the extension 3 and engaging a circumferential shoulder on the body 4. The inner end portion of the body 4 extends through the ring 5.

A cartridge or shell 6 containing compressed air or gas is mounted in the member 1 and has a tapered end portion 7 extending into the hollow elastic body 4 and compressing said body between the end portion 7 and the parts 3 and 5 in order to form a hermetic joint between said parts.

The inner end of the end portion 2 is formed with a recess, comprising the relatively large part 8 and the relatively small part 9 concentric therewith. The diameter of the part 8 of said recess is less than the diameter of the elastic body 4.

A combined puncturing, sealing and passage-forming element is mounted in the recess 8—9 and extends into the body 4. Said element comprises a cylindrical part 10 mounted in the part 9 of the recess, an annular flange 11 mounted in the part 8 of the recess, a cylindrical extension 12 mounted in the central opening in the body 4, and a puncturing tube 13 extending from the inner end of the extension 12. An elastic sealing gasket 14 is mounted in a concave recess in the flange 11 around the part 10. The inner end of the tube 13 is beveled to provide a sharp cutting edge 15, which will cut through and puncture the outer end wall 16 of the cartridge or shell 6 when the members 1 and 2 are screwed together in the relationship shown. The opening through the tube 13 opens through a passage 17 into the recess 9 beyond the outer end of the part 10. A passage 18 opens through the parts 10 and 12 to form communication from the space between the inner end of the part 12 and the end wall 16 of the cartridge or shell so as to permit any compressed air or gas to pass from said space to the outer end of the part 10.

A valve chamber 19 is formed in the member 2 and has communication with the cavity 9 through a port 20. The outer end of the member 2 is formed with an internally threaded recess into which a plug 21 is screwed, the inner end of said plug pressing against a metallic compression washer 22 seated on a combined elastic sealing washer and valve seat 23 mounted in the inner end of said recess.

A valve, comprising an annular wall 24 mounted for longitudinal sliding movements in the valve chamber 19, is attached to the inner end of a valve stem 25. A disc 26, attached to the outer end of the valve stem 25, operates in a hole 27 through the plug 21 and guides the valve and valve stem. A spring 28 encircles the stem 25 and has its inner end seated against the compression washer 22 and its outer end pressing against the disc 26 and is effective to close the valve 24 and hold the outer end thereof embedded or indented in the elastic sealing washer 23. When the valve is thus closed, it is impossible for the compressed air or gas to pass the valve.

A spacer ring 29 is seated against the outer end of the plug 21 and has an opening 30 through one side thereof communicating with an outlet passage 31 through the member 2. A tubular connecting device 32 has one end secured to the member 2 and communicating with the passage 31 and constitutes means whereby the compressed air or gas may be discharged and controlled, as desired.

An elastic washer 33 is seated on the ring 29 and supports a metallic washer 34. A plug 35, screwed in the outer end of the member 2, supports and guides a valve stem 36, having its inner end slightly spaced from and in alinement with the outer end of the valve stem 25. An annular flange 37 is rigid with the valve stem 36 and bears against the outer surface of the washer 34. A spring 38 encircles the valve stem 36 and has one end seated against the plug 35 and the opposite end engaging an enlargement 39 on the valve stem 36 and is effective to move said valve stem outwardly to its unoperated position. A knob or button 40 is attached to the outer end of the stem 36 for convenient engagement by the thumb or any one of the fingers in order to move the valve stem 36 inwardly in opposition to the spring 38.

To adapt the invention for use, a shell or cartridge 6 containing compressed air or gas or the like is mounted in the member 1 with the tapered end 7 thereof outwardly. Then the member 2 is screwed into close engagement with the member 1, the tube 13 cutting through the end wall 16 of the shell or cartridge and extending into the shell or cartridge for a short distance, as shown. This permits the compressed air or gas to pass through the tube 13 and the passage 17 to the space beyond the outer end of the part 10. Any compressed air or gas escaping from the shell or cartridge around the tube 13 may pass to the outer end of the part 10 through the part 18. From the cavity space 9 the compressed air or gas may pass through the port 20 into the valve chamber 19 but cannot escape from said chamber because of the sealing engagement of the combined valve seat and sealing washer 23 with the end of the valve 24 and with the member 2. When it is desired to discharge any of the compressed air or gas, the stem 39 is pressed inwardly in opposition to the spring 38 a distance sufficient to engage the outer end of the stem 25 and to move said stem 25 longitudinally to disengage the valve 24 from the combined valve seat and sealing gasket 23. This permits the compressed air or gas in the valve chamber 19 to pass around the valve 24 and thence around the valve stem 25, through the opening 41 and through the hole 27, around the disc 26 and outwardly through 30, 31 and 32. When the valve stem 39 is released, the spring 38 moves the same outwardly and the spring 28 moves the valve stem 25 outwardly and thereby moves the valve 24 into close sealing engagement with the combined elastic valve seat and sealing washer 23.

This invention may be applied to various uses and may be modified within the scope of equivalent limits without departure from the nature and principle thereof.

We claim:

1. A compressed air gun comprising a housing having a valve chamber therein and an inlet passage opening into said chamber, an elastic valve seat at the outer end of said chamber and having an outlet passage therethrough, devices mounted in said housing clamping said valve seat in position and having a chamber therein communicating with said outlet passage and opening to the outside of said housing, a valve mounted in said valve chamber having an annular portion movable into and out of engagement with said valve seat and having a stem extending through said outlet passage into said last named chamber, a member attached to said valve stem in said last named chamber guiding said valve stem in longitudinal movements, a spring connected with said valve stem in said last named chamber for moving said valve into engagement with said valve seat, and a stem supported by said housing in axial alinement with said valve stem for moving said valve stem in opposition to said spring to disengage said valve from said valve seat.

2. A compressed air gun comprising a housing having a valve chamber therein and an inlet passage opening into said chamber, a valve seat at the outer end of said chamber and having an outlet passage therethrough, a member mounted in said housing holding said valve seat in position and having a chamber therein communicating with said outlet passage to the outside of said housing, a valve mounted in said valve chamber movable into and out of engagement with said valve seat and having a stem extending through said outlet passage into said last named chamber, a part attached to said valve stem in said last named chamber guiding said valve stem in longitudinal movements, a spring mounted on said valve stem for moving said valve into engagement with said valve seat, a support at the outer end of said chamber, and a stem mounted for sliding movements in said support in axial alinement with said valve stem for moving said valve stem in opposition to said spring to open said valve.

3. A compressed air gun comprising a housing having a valve chamber therein and an inlet passage opening into said chamber, a valve seat at the outer end of said chamber and having an outlet passage therethrough, a member mounted in said housing holding said valve seat in position and having a chamber therein communicating with said outlet passage to the outside of said housing, a valve mounted in said valve chamber movable into and out of engagement with said valve seat and having a stem extending through said outlet passage into said last named chamber, a part attached to said valve stem in said last named chamber guiding said valve stem in longitudinal movements, a spring mounted on said valve stem for moving said valve into engagement with said valve seat, a support at the outer end of said chamber, a stem mounted for sliding movements in said support in axial alinement with said valve stem for moving said valve stem in opposition to said spring to open said valve, and detachable means supported by said housing for discharging air through said inlet passage into said valve chamber.

MARION L. J. LAMBERT.
CALVIN LATHAM.